(12) United States Patent
Ogawa et al.

(10) Patent No.: US 6,663,701 B2
(45) Date of Patent: Dec. 16, 2003

(54) EMULSION INK FOR STENCIL PRINTING AND ITS USE

(75) Inventors: Hiroyuki Ogawa, Ibaraki-ken (JP); Hideaki Takayama, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 99 days.

(21) Appl. No.: 10/042,238

(22) Filed: Jan. 11, 2002

(65) Prior Publication Data

US 2002/0148385 A1 Oct. 17, 2002

(30) Foreign Application Priority Data

Jan. 26, 2001 (JP) ..................... P2001-018705

(51) Int. Cl.$^7$ .............................................. C09D 11/00
(52) U.S. Cl. ................ 106/31.25; 106/31.26; 106/31.34; 106/31.66
(58) Field of Search ........................ 106/31.25, 31.26, 106/31.34, 31.66

(56) References Cited

U.S. PATENT DOCUMENTS

| | | | |
|---|---|---|---|
| 5,378,739 A | 1/1995 | Koike et al. ................ 523/161 |
| 5,622,548 A | 4/1997 | Zou et al. ................. 106/31.26 |
| 5,800,599 A | 9/1998 | Asada ..................... 106/31.26 |
| 5,853,466 A * | 12/1998 | Matsuura et al. .......... 106/31.26 |
| 5,902,388 A * | 5/1999 | Matsuura et al. ......... 106/31.25 |
| 6,011,083 A * | 1/2000 | Okuda et al. ............... 523/161 |
| 6,165,258 A | 12/2000 | Asada ..................... 106/31.26 |
| 2002/0124770 A1 * | 9/2002 | Hayashi ................... 106/31.26 |
| 2002/0129735 A1 * | 9/2002 | Hayashi et al. .......... 106/31.26 |

FOREIGN PATENT DOCUMENTS

| | | |
|---|---|---|
| JP | 61-255967 | 11/1986 |
| JP | 05117564 * | 5/1993 |
| JP | 05-125320 | 5/1993 |
| JP | 10-245516 | 9/1998 |
| WO | WO 96/36672 | 11/1996 |

OTHER PUBLICATIONS

Derwent abstract of JP05/117564, May 1993.*
Derwent Publications Ltd., London, GB; AN 1998–551284, XP002197644 & JP 10 245516 A (Tohoku Riko KK), Sep. 14, 1998, abstract thereof.

* cited by examiner

*Primary Examiner*—Helene Klemanski
(74) *Attorney, Agent, or Firm*—Nath & Associates PLLC; Gary M. Nath; Joshua B. Goldberg

(57) ABSTRACT

An emulsion ink for stencil printing comprises 20 to 50 wt. % of an oil phase and 50 to 80 wt. % of a water phase, and contains at least one kind of a vegetable oil with an iodine number ranging from 110 to 150 in the oil phase at least in an amount indicated by the following formula in wt. %, and an antioxidant in an amount ranging from 1 to 10 wt. % based on the content of the vegetable oil:

Minimum amount of vegetable oil in wt. %=amount of water in ink in wt. %×(100/iodine number)×0.09.

The ink causes no clogging or offset when a printer is not in operation and the ink is left in a printing drum of the printer for a long period of time.

Disclosed is also a printed matter printed by the emulsion ink of the present invention.

14 Claims, No Drawings

EMULSION INK FOR STENCIL PRINTING AND ITS USE

BACKGROUND OF THE INVENTION

1. Field of the Invention

The present invention relates to an emulsion ink for use in stencil printing, particularly to an emulsion ink containing a vegetable oil, and to a printed matter printed by the emulsion ink for stencil printing.

2. Description of the Related Art

In the stencil printing method, a stencil master is prepared by perforating a stencil sheet in accordance with a desired image, and ink is passed through a perforated portion of the stencil sheet, thereby printing on an image-receiving medium such as paper. Stencil printing is utilized for a variety of purposes because of its ease of handling and convenience.

As the ink for stencil printing, a water-in-oil (W/O) type emulsion ink is mainly used. A high-boiling point solvent such as a nondrying oil or a nonvolatile mineral oil is used for the emulsion ink for its oil phase, thus preventing so-called clogging in which the ink dries and solidifies on a printing drum of a printer and at the perforated portion of a stencil sheet, which hinders the ink from passing through the stencil sheet, when the printer is not in operation for a long period of time. On the other hand, when the ink is left in a printing drum of a printer for a long period of time, water content in the ink evaporates since the ratio of a water phase as an inner phase of the emulsion is relatively high. The ratio between an oil phase and the water phase becomes unbalanced, and ink viscosity decreases. As a result, an excessive amount of ink is transferred to printing paper when printing is restarted. Accordingly, problems occur such as increased image density and an offset phenomenon (unintentional transfer of an inked impression from printed surface of one printing paper to the reverse side of another printing paper by contact).

In order to solve these problems, Japanese Patent No. 2096338 proposes the use of a solvent having a boiling point of 180 to 270° C. Additionally, Japanese Unexamined Patent Application Publication No. 5-125320 proposes the use of a solvent that consists of 10 to 30 wt. % of a volatile solvent with an initial boiling point of 150 to 210° C. and 70 to 90 wt. % of a nonvolatile solvent. These proposals are intended to prevent changes in the ratio between a water phase and an oil phase of an emulsion ink and to prevent a decrease in ink viscosity by adding each specified amount of each solvent having the specified range of boiling point or initial boiling point, so as to allow a small amount of the solvent as an oil component to evaporate, along with evaporation of the water content in the ink.

However, even when no problems would occur in the above ink after standing not in operation at an ordinary temperature (23° C.) for one week or one month, clogging may occur due to the evaporation of a solvent when the environmental temperature rises. Also the evaporation of the solvent may damage health of printing operators and ink manufacturers.

On the other hand, ink using a vegetable oil has recently attracted attention as an environment-consciously developed printing ink. For instance, Japanese Unexamined Patent Application Publication No. 10-245516 proposes a water-in-oil type emulsion ink for stencil printing using a vegetable oil which has an iodine number of 100 or less and a congeal point (freezing point) of 0° C. or below. This ink uses a nondrying oil with an iodine number of 100 or less in order to prevent the ink from solidifying. However, when the ink is left for a long period of time, water content in the ink may evaporate and the viscosity of the ink may decrease, thereby causing excess transfer of ink and offset.

SUMMARY OF THE INVENTION

It is therefore an object of the present invention to provide an emulsion ink which causes neither clogging nor offset after a long nonuse period of time, has shelf stability and is harmless to environment and ink handlers. Here, "a long nonuse period of time" refers to the condition under which a printer is not in operation and ink is allowed to stand in a printing drum of the printer for a long period of time. Another object of the present invention is to provide a printed matter having a desirable printing image and no offset after a long nonuse period of time.

The present inventors focused on the oxidation phenomenon of a vegetable oil and its iodine number as an index for the unsaturation degree of the vegetable oil. They found that an emulsion ink for stencil printing, which causes neither clogging nor offset after a long nonuse period of time and has shelf stability, can be provided by mixing a vegetable oil with an iodine number ranging from 110 to 150 in a specific amount or more relative to the water amount in the ink, and furthermore, by mixing an antioxidant in a specified range based on the amount of the vegetable oil mixed.

Specifically, a water-in-oil type emulsion ink for stencil printing relating to the present invention includes 20 to 50 wt. % of an oil phase and 80 to 50 wt. % of a water phase, and contains at least one kind of a vegetable oil with an iodine number ranging from 110 to 150 in the oil phase in an amount of the following formula (1) or more in wt. %, and an antioxidant in a range of 1 to 10 wt. % based on the content of the vegetable oil:

Minimum amount of vegetable oil in wt. %=amount of water in ink in wt. %×(100/iodine number)×0.09 (1)

According to the present invention, a change in ink viscosity due to water evaporation can be prevented by controlling an increase in viscosity due to the oxidation of the vegetable oil in the ink, providing an emulsion ink for stencil printing which causes no clogging or offset after a long nonuse period of time and which has shelf stability. Furthermore, the use of a vegetable oil enables one to provide an ecologically superior ink that is designed for reducing environmental damage and improving safety of printing operators and ink manufacturers.

In another aspect, the present invention provides a printed matter printed by the emulsion ink mentioned above. By utilizing the emulsion ink of the present invention, a printed matter having a desirable printing image and no offset can be produced after a long nonuse period of time.

DESCRIPTION OF THE PREFERRED EMBODIMENTS

A water-in-oil type emulsion ink for use in stencil printing (mentioned as "ink" hereinafter) relating to the present invention includes 20 to 50 wt. % of an oil phase and 80 to 50 wt. % of a water phase, and contains at least one kind of a vegetable oil with an iodine number ranging from 110 to 150 at least in the minimum amount specified by the above formula (1) relative to the water content in the ink. The semidrying or drying vegetable oil contained is oxidized after a long nonuse period of time, thereby increasing ink viscosity. Accordingly, a decrease in ink viscosity due to water evaporation from the ink can be controlled, and excess ink transfer and offset (and deterioration of such offset) after a long nonuse period of time can be prevented. Furthermore, since the ink contains the antioxidant in the specified amount based on the amount of the vegetable oil, drying solidification due to excess oxidation of the vegetable oil can also be prevented. As a result, the emulsion ink is free of clogging after a long nonuse period of time and its shelf stability is maintained.

Here, the vegetable oil is contained in an oil phase, whereas the antioxidant may be contained in any phase, such as an oil phase, a water phase, and oil and water phases. The phase in which the antioxidant is contained can be properly selected based on the kind of antioxidant and the solubility thereof in a water phase or an oil phase.

The vegetable oil with an iodine number ranging from 110 to 150 is a semidrying oil or a drying oil. Examples thereof include soybean oil, corn oil, sunflower oil, rapeseed oil, safflower oil, grape seed oil, sesame oil and the like. Each of these vegetable oils be used singly or in combination with one or more kinds thereof.

When the iodine number of the vegetable oil is 110 or above, an appropriate increase in ink viscosity due to the oxidation of the vegetable oil can be obtained. This increase can control and compensate a decrease in ink viscosity due to water evaporation after a long nonuse period of time. As a result, at the starting of printing (the rising time) after a nonuse period, excess ink transfer can be prevented. Further, when the iodine number is 150 or less, clogging due to a sharp increase in the viscosity and drying solidification of the vegetable oil can be prevented even after a long nonuse period of time. A vegetable oil having an iodine number of more than 150 has high polarity, so that the solubility balance of an oil phase tends to be destroyed and the shelf stability of the emulsion ink may deteriorate.

The vegetable oil is contained at least in an amount expressed by the following Formula (1) relative to an amount of water in ink in wt. %:

Minimum amount of vegetable oil in wt. %=amount of water in ink in wt. %×(100/iodine number)×0.09 (1)

Since the iodine number indicates an unsaturation degree (double bond content) in 100 g of fatty acid, the present inventors considered the amount of vegetable oil x (iodine number/100) as an index for an increase in the viscosity of the vegetable oil. The inventors presented a new view that a decrease in the ink viscosity due to water evaporation can be effectively prevented when the index is at a certain rate or above relative to the amount of water, and experimentally found a coefficient of 0.09. Finally, Formula (1) mentioned above was derived therefrom. When the coefficient is less than 0.09, the effects of the present invention cannot fully be obtained. When the amount of a vegetable oil is that specified by the above Formula (1) or more, a decrease in the ink viscosity after a long nonuse period of time can effectively be avoided, preventing excess ink transfer and offset. The maximum content of the vegetable oil is controlled so that an oil phase ratio is adjusted to 20 to 50 wt. % in the ink. Since the antioxidant is mixed in an amount ranging from 1 to 10 wt. % based on the amount of the vegetable oil mixed in an amount of the above Formula (1) or more, an increase in the viscosity of the vegetable oil can be controlled, if necessary, by adjusting the amount of the antioxidant depending on the amount of the vegetable oil and the iodine number thereof. It is preferable that the content of the vegetable oil is 20 wt. % or less, or more preferably, 15 wt. % or less based on the total weight of ink in order to secure the stability of the emulsion.

An adequate known antioxidant such as dibutylhydroxytoluene, propyl gallate, octyl gallate, tocopherol and butylhydroxyanisole is employable as the antioxidant. Each of them can be used singly or in combination thereof. Moreover, a water-soluble antioxidant such as sodium erythorbate and sodium ascorbate may be added to a water phase of the ink.

The antioxidant is added in a range of 1 to 10 wt. % based on the content of the vegetable oil. When the content is 1 wt. % or more, the drying solidification of the vegetable oil after a long nonuse period of time can be avoided, thereby preventing clogging. On the other hand, when the content exceeds 10 wt. %, the oxidation of the vegetable oil after a long nonuse period of time may be inhibited excessively and a sufficient increase in ink viscosity for inhibiting a decrease in ink viscosity may not be obtained, and besides, the stability of emulsion may be damaged.

In addition to the above-noted vegetable oil and antioxidant (in the case of mixing to an oil phase), other components such as an oil component other than the vegetable oil mentioned above, a surfactant, a coloring agent, an extender pigment, etc. can be mixed in an oil phase. Furthermore, it is preferable that a resin is contained. The coloring agent may be contained in a water phase or both water and oil phases.

The oil component, other than the vegetable oil with an iodine number ranging from 110 to 150, can be, for example, a nondrying oil such as castor oil, tsubaki oil, olive oil, coconut oil and palm oil; a mineral oil such as liquid paraffin, spindle oil, gas oil, kerosene, machine oil, lubricating oil and synthetic fluid; and a petroleum-based solvent such as olefinic hydrocarbon and aromatic hydrocarbon. Each of the oil components can be used singly or in combination thereof. The oil component is contained in such an amount that the whole amount of an oil phase containing a vegetable oil with an iodine number ranging from 110 to 150 and other additives as required is adjusted to 20 to 50 wt. %.

Examples of the surfactant include anionic surfactants such as a metallic soap, a sulfate ester salt of higher alcohol, and a sulfate ester salt of polyoxyethylene adduct; cationic surfactants such as primary, secondary and tertiary amine salts, and a quaternary ammonium salt; ether type nonionic surfactants such as a polyoxyethylene ether of higher alcohol, an alkylphenol polyoxyethylene ether, and polyoxyethylene ether of polyoxypropylene; ester type nonionic surfactants consisting of polyhydric alcohols and fatty acids, such as a sorbitan fatty acid ester and a polyglycerol fatty acid ester; ether ester type nonionic surfactants such as a polyoxyethylene ether of fatty acid, a polyoxyethylene ether of polyglycerol fatty acid ester, and polyoxyethylene ether of castor oil; and nitrogen-containing type nonionic surfactants such as an alkylolamide of fatty acid. Each of the surfactants can be used singly or in combination with one or more kinds thereof. The amount thereof can be properly determined based on the molar concentration of each surfactant, the area of an interface of a water phase and an oil phase, and partially the area of an interface of an oil phase and a solid such as a pigment. Generally, the amount is preferably about 0.1 to 10 wt. %, and more preferably, about 1 to 5 wt. % based on the total weight of the ink.

Examples of the coloring agent include organic pigments such as an insoluble azo pigment, a soluble azo pigment, phthalocyanine blue, dye lake, isoindolinone, quinacridone, dioxazine violet, perinone, and perylene; inorganic pigments such as carbon black and titanium dioxide; azo-based, anthraquinone-based or azine-based oil-soluble dyes; water-soluble dyes, and disperse dyes. Each of the coloring agents can be used singly or in combination with one or more kinds thereof so as to achieve the required hue, and may be a mixture of pigment and dye. Although the amount thereof can appropriately be set, it is in general preferably 20 wt. % or less, and more preferably, 3 to 10 wt. % based on the total weight of the ink.

Examples of the resin include phenol resins, maleic acid resins, petroleum resins, rubber resins, alkyd resins, and rosin-modified resins. Each of them can be used singly or in combination with one or more kinds thereof. The resin can add viscosity to the ink and improve the stability of the emulsion. Moreover, when an oil phase contains a pigment or extender pigment, their dispersibility in the ink and their fixing property to the printing paper can be improved.

In addition to the above, a known pigment dispersant can be added to the oil phase of the ink as long as the preparation and stability of the emulsion are not disturbed. A compound containing a wax or the like as a main component may also be added as an auxiliary agent to adjust the fluidity.

Next, a water phase of the ink can contain a known component such as a oil-in-water (O/W) type resin emulsion, a water soluble resin, a wetting agent, an electrolyte, an antioxidant, a pH adjustor, an antifreezing agent, etc.

Examples of the oil-in-water type resin emulsion include polyvinyl acetate, ethylene-vinyl acetate copolymer, vinyl acetate-acrylic ester copolymer, polymethacrylic ester, polystyrene, styrene-acrylate ester copolymer, styrene-butadiene copolymer, vinylidene chloride-acrylate ester copolymer, vinyl chloride, vinyl chloride-vinyl acetate copolymer, and urethane. Each of the resins can be used singly or in combination with one or more kinds thereof.

Examples of the water soluble resin include polyvinyl alcohol, methyl cellulose, carboxymethyl cellulose, hydroxyethyl cellulose, polyvinyl pyrrolidone, polyethylene-polyvinyl alcohol copolymer, polyethylene oxide, polyvinyl ether, polyacrylamide, gum arabic, starch, and water soluble urethane. Each of the resins can be used singly or in combination with one or more kinds thereof.

The total mixing amount of the oil-in-water type resin emulsion and/or water soluble resin is, in terms of solid content, preferably 20 wt. % or less, and more preferably, 10 wt. % or less based on the total weight of the ink in order to ensure the ink permeability. Such resin component can improve the wettability and dispersibility of the pigment and extender pigment, and their fixing property to the printing paper.

Examples of the wetting agent include polyhydric alcohols such as ethylene glycol, sorbitol and glycerol, and polyethylene glycol.

Examples of the electrolyte include sodium sulfate, magnesium sulfate, potassium hydrogenphosphate, sodium citrate, potassium tartrate, and sodium borate.

Examples of the antifreezing agent (a vaporization-suppressive component) include polyhydric alcohols such as ethylene glycol and propylene glycol, and alkyl ethers of polyhydric alcohols such as ethylene glycol monoethyl ether.

The oil phase and the water phase each including the above-noted components are mixed with the respective ratios of (20 to 50 wt. % of the oil phase) to (80 to 50 wt. % of the water phase). Both phases are mixed and emulsified to make the ink. It is preferable that the water phase and the oil phase are separately prepared, then the water phase liquid is added to the oil phase liquid and emulsified. A known emulsifier such as a dispersion mixer, a homo mixer and a high pressure homogenizer can be used for the ink manufacture.

A printed matter relating to the present invention is printed using the ink of the present invention mentioned above.

As an image-receiving medium (a substrate to be printed) of the printed matter, for example, any printing paper can be used with no special limitation. The stencil printing using the ink of the present invention can be carried out by using a known stencil printer. The design and operating conditions of the printer are not particularly limited.

The present invention will be explained below in further detail by referring to the embodiments. In the following description, "parts" indicate "weight parts".

1. Preparation of Ink

Examples 1 to 7

Comparative Examples 1 to 6

Each example and comparative example of ink was prepared in the following order by using the components shown in Table 1 and Table 2. First, carbon black (MA100 manufactured by Mitsubishi Chemical Corp.) and alkyd resin (ARAKYD No. 4 manufactured by Arakawa Chemical Industries, Ltd.) were dispersed using a three-roll mill, to prepare a pigment dispersion. Subsequently, a vegetable oil, a spindle oil (white spindle oil manufactured by Nippon Mitsubishi Oil Corp.), a solvent (AF6 manufactured by Nippon Mitsubishi Oil Corp., boiling point: 301 to 321° C.), dibutylhydroxytoluene and sorbitan sesquioleate were added to the dispersion as the remaining oil phase components and mixed, thus obtaining an oil phase. Meanwhile, ethylene glycol and magnesium sulfate were added to ion exchange water and mixed, thus obtaining a water phase. The water phase was gradually added to the oil phase and emulsified, thus obtaining a water-in-oil type emulsion ink for stencil printing.

2. Evaluation of the Ink and Printed Matter

Using each obtained emulsion ink, a stencil printer (RISOGRAPH FR275 (trademark) manufactured by Riso Kagaku Corp.) and a printing paper (wood free paper; RISO-YOSHI, Usukuchi) manufactured by Riso Kagaku Corp., clogging property, offset property and high temperature storage stability of the ink after standing were evaluated as follows.

A. Clogging

Printing was conducted after allowing the ink to stand in a printing drum of the printer for one month under ordinary temperature (23° C., 50% RH) or under high temperature (40° C.). The evaluation was done according the following criteria:

G: Desirable printing images were obtained during printing up to 50 sheets.

M: Desirable printing images were obtained during printing between 50 and 100 sheets.

NG: Clogging occurred and desirable printing images were not obtained even after printing over 100 sheets.

B. Offset

Printing was conducted after allowing the ink to stand in a printing drum of the printer for one month under ordinary temperature (23° C., 50% RH). Rear surfaces of the first to the twentieth printed matter were visually observed. The evaluation was done according the following criteria:

G: There was no offset.
M: There was slight offset.
NG: There was clear offset.

C. High Temperature Storage Stability

The ink was allowed to stand in a sealed system at 70° C. for one week or for one month, and the state of the ink was visually observed. The evaluation was done according the following criteria:

G: The emulsion had not disintegrated.
M: There was slight oil floating (oil bleeding).
NG: The emulsion had disintegrated.

The results are shown in Table 1 and Table 2.

TABLE 1

| Composition/weight parts | | Examples | | | | | | |
|---|---|---|---|---|---|---|---|---|
| | | 1 | 2 | 3 | 4 | 5 | 6 | 7 |
| Oil phase | | | | | | | | |
| Coloring agent | Carbon black | 5.0 | 5.0 | 5.0 | 5.0 | 5.0 | 5.0 | 5.0 |
| Resin | Alkyd resin | 6.0 | 6.0 | 6.0 | 6.0 | 6.0 | 6.0 | 6.0 |
| Oil component | Spindle oil | 6.0 | 6.0 | 15.0 | 6.0 | 7.0 | 9.0 | 6.0 |
| | Solvent (AF6) | 6.9 | 6.9 | 12.1 | 6.9 | 7.9 | 7.0 | 5.0 |
| Vegetable oil | Rapeseed oil (IN = 113) | 6.0 | 0 | 0 | 0 | 0 | 0 | 0 |
| | Soybean oil (IN = 130) | 0 | 6.0 | 4.0 | 0 | 4.0 | 15.0 | 20.0 |
| | Safflower oil (IN = 145) | 0 | 0 | 0 | 6.0 | 0 | 0 | 0 |
| Surfactant | Sorbitan sesquioleate | 4.0 | 4.0 | 4.0 | 4.0 | 4.0 | 4.0 | 4.0 |
| Antioxidant | Dibutylhydroxy toluene | 0.1 | 0.1 | 0.1 | 0.1 | 0.1 | 0.2 | 0.2 |
| Water phase | | | | | | | | |
| Water | Ion exchange Water | 55.0 | 55.0 | 45.0 | 55.0 | 55.0 | 45.0 | 45.0 |
| Electrolyte | Magnesium sulfate | 1.0 | 1.0 | 0.8 | 1.0 | 1.0 | 0.8 | 0.8 |
| Antifreezing agent | Ethylene glycol | 10.0 | 10.0 | 8.0 | 10.0 | 10.0 | 8.0 | 8.0 |
| Total | | 100.0 | 100.0 | 100.0 | 100.0 | 100.0 | 100.0 | 100.0 |
| MA of vegetable oil | | 4.38 | 3.81 | 3.12 | 3.41 | 3.81 | 3.12 | 3.12 |
| RA of antioxidant | | 0.06–0.6 | 0.06–0.6 | 0.04–0.4 | 0.06–0.6 | 0.04–0.4 | 0.15–1.5 | 0.20–2.0 |
| Clogging (23° C., 1 month) | | G | G | G | G | G | G | G |
| Clogging (40° C., 1 month) | | G | G | G | G | G | G | G |
| Offset (23° C., 1 month) | | G | G | G | G | G | G | G |
| High temperature storage stability (70° C., 1 week) | | G | G | G | G | G | G | G |
| High temperature storage stability (70° C., 1 month) | | G | G | G | G | G | G | M |

IN: iodine number
MA of vegetable oil: Minimum amount of vegetable oil calculated from Formula (1)
RA of antioxidant: Required amount of antioxidant based on amount of vegetable oil

TABLE 2

| Composition/weight parts | | Comparative Examples | | | | | |
|---|---|---|---|---|---|---|---|
| | | 1 | 2 | 3 | 4 | 5 | 6 |
| Oil phase | | | | | | | |
| Coloring agent | Carbon black | 5.0 | 5.0 | 5.0 | 5.0 | 5.0 | 5.0 |
| Resin | Alkyd resin | 6.0 | 6.0 | 6.0 | 6.0 | 6.0 | 6.0 |
| Oil component | Spindle oil | 10.0 | 1.0 | 6.0 | 6.0 | 7.0 | 5.0 |
| | Solvent (AF6) | 5.95 | 1.7 | 6.99 | 6.0 | 7.8 | 5.9 |
| Vegetable oil | Soybean oil (IN = 130) | 3.0 | 4.0 | 6.0 | 6.0 | 0 | 0 |
| | Linseed oil (IN = 170) | 0 | 0 | 0 | 0 | 4.0 | 0 |
| | Castor oil (IN = 86) | 0 | 0 | 0 | 0 | 0 | 8.0 |
| Surfactant | Sorbitan | 4.0 | 4.0 | 4.0 | 4.0 | 4.0 | 4.0 |

TABLE 2-continued

| Composition/weight parts | | Comparative Examples | | | | | |
|---|---|---|---|---|---|---|---|
| | | 1 | 2 | 3 | 4 | 5 | 6 |
| Antioxidant | sesquioleate Dibutylhydroxytoluene | 0.05 | 0.1 | 0.01 | 1.0 | 0.2 | 0.1 |
| Water phase | | | | | | | |
| Water | Ion exchange water | 55.0 | 65.0 | 55.0 | 55.0 | 55.0 | 55.0 |
| Electrolyte | Magnesium sulfate | 1.0 | 1.2 | 1.0 | 1.0 | 1.0 | 1.0 |
| Antifreezing agent | Ethylene glycol | 10.0 | 12.0 | 10.0 | 10.0 | 10.0 | 10.0 |
| Total | | 100.0 | 100.0 | 100.0 | 100.0 | 100.0 | 100.0 |
| MA of vegetable oil | | 3.81 | 4.50 | 3.81 | 3.81 | 2.91 | 5.76 |
| RA of antioxidant | | 0.03–0.3 | 0.04–0.4 | 0.06–0.6 | 0.06–0.6 | 0.04–0.4 | 0.08–0.8 |
| Clogging (23° C., 1 month) | | G | G | M | G | M | G |
| Clogging (40° C., 1 month) | | G | G | NG | G | NG | G |
| Offset (23° C., 1 month) | | NG | NG | G | M | — | NG |
| High temperature storage stability (70° C., 1 week) | | G | G | G | NG | NG | G |
| High temperature storage stability (70° C., 1 month) | | G | G | G | NG | NG | G |

IN: iodine number
MA of vegetable oil: Minimum amount of vegetable oil calculated from Formula (1)
RA of antioxidant: Required amount of antioxidant based on amount of vegetable oil
—: Impossible to evaluate due to clogging It was found that the ink samples of the examples all had shelf stability and provided the printed matter with preferable printing images even after being left under these predetermined conditions. On the other hand, a decrease in the viscosity of the ink samples due to water evaporation could not be fully prevented and offset of printed matter was observed in Comparative Example 1 (coefficient in Formula (1) is 0.07) and Comparative Example 2 (coefficient in Formula (1) is 0.08) in which both ink samples had smaller amounts of vegetable oil than the amounts expressed by Formula (1). In Comparative Example 3, because the amount of antioxidant in the ink was not enough with respect to the amount of vegetable oil, the vegetable oil was oxidized too much and clogging occurred after the ink was left at 40° C. for one month. The ink of Comparative Example 4 containing too much antioxidant with respect to the amount of vegetable oil had poor shelf stability, because the oxidation degree of vegetable oil was too small with respect to the amount of water evaporation. Furthermore, the ink of Comparative Example 5 containing a vegetable oil with too high iodine number and the ink of Comparative Example 6 containing a vegetable oil with too low iodine number could not properly control the oxidation of vegetable oil and preferable results were not obtained, although both amounts of each vegetable oil satisfied the Formula (1) and contained the necessary amounts of antioxidant with respect to the amounts of vegetable oil.

The present disclosure relates to subject matter contained in Japanese Patent Application No. 2001-018705, filed on Jan. 26, 2001, the disclosure of which is expressly incorporated herein by reference in its entirety.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An emulsion ink for stencil printing comprising 20 to 50 wt. % of an oil phase and 50 to 80 wt. % of a water phase, wherein the emulsion ink contains in the oil phase at least one kind of a vegetable oil with an iodine number ranging from 110 to 150 at least in an amount indicated by the following formula in wt. %, and an antioxidant in an amount ranging from 1 to 10 wt. % based on the content of the vegetable oil:

Minimum amount of vegetable oil in wt. %=amount of water in ink in wt. %×(100/iodine number)×0.09.

2. A printed matter printed by the emulsion ink for stencil printing according to claim 1.

3. The emulsion ink for stencil printing according to claim 1, wherein the vegetable oil is selected from the group consisting of a soybean oil having an iodine number ranging from 110 to 150, a corn oil having an iodine number ranging from 110 to 150, a sunflower oil having an iodine number ranging from 110 to 150, a rapeseed oil having an iodine number ranging from 110 to 150, a safflower oil having an iodine number ranging from 110 to 150, a grape seed oil having an iodine number ranging from 110 to 150, a sesame oil having an iodine number ranging from 110 to 150, and mixtures thereof.

4. The emulsion ink for stencil printing according to claim 1, wherein the vegetable oil is a soybean oil having an iodine number ranging from 110 to 150.

5. The emulsion ink for stencil printing according to claim 1, wherein the antioxidant is selected from the group consisting of dibutylhydroxytoluene, propyl gallate, octyl gallate, tocopherol, butylhydroxyanisole, and mixtures thereof.

6. The emulsion ink for stencil printing according to claim 1, wherein the antioxidant is dibutylhydroxytoluene.

7. The emulsion ink for stencil printing according to claim 1, wherein the vegetable oil is selected from the group consisting of a soybean oil having an iodine number ranging from 110 to 150, a corn oil having an iodine number ranging from 110 to 150, a sunflower oil having an iodine number ranging from 110 to 150, a rapeseed oil having an iodine number ranging from 110 to 150, a safflower oil having an iodine number ranging from 110 to 150, a grape seed oil having an iodine number ranging from 110 to 150, a sesame oil having an iodine number ranging from 110 to 150, and mixtures thereof, and the antioxidant is selected from the group consisting of dibutylhydroxytoluene, propyl gallate, octyl gallate, tocopherol, butylhydroxyanisole, and mixtures thereof.

8. The emulsion ink for stencil printing according to claim 1, wherein the vegetable oil is a soybean oil having an iodine number ranging from 110 to 150 and the antioxidant is dibutylhydroxytoluene.

9. The emulsion ink for stencil printing according to claim 1, further containing an oil component other than the vegetable oil.

10. The emulsion ink for stencil printing according to claim 9, wherein the oil component is selected from the group consisting of a nondrying oil, a mineral oil, a petroleum-based solvent, and mixtures thereof.

11. The emulsion ink for stencil printing according to claim 1, further containing a resin.

12. The emulsion ink for stencil printing according to claim 11, wherein the resin is selected from the group consisting of phenol resins, maleic acid resins, petroleum resins, rubber resins, alkyd resins, rosin-modified resins, and mixtures thereof.

13. The emulsion ink for stencil printing according to claim 1, further containing a surfactant.

14. The emulsion ink for stencil printing according to claim 1, further containing an oil component other than the vegetable oil, a resin, and a surfactant.

* * * * *